United States Patent [19]

Ferrero

[11] Patent Number: 4,963,379
[45] Date of Patent: Oct. 16, 1990

[54] CHOCOLATE AND WAFER BAR

[75] Inventor: Pietro Ferrero, Bruxelles, Belgium

[73] Assignee: Ferrero S.p.A., Italy

[21] Appl. No.: 364,706

[22] Filed: Jun. 12, 1989

[30] Foreign Application Priority Data

Jun. 16, 1988 [IT] Italy .................. 53226/88[U]

[51] Int. Cl.⁵ .................................. A23G 3/00
[52] U.S. Cl. ........................ 426/306; 426/93;
426/94; 426/103; 426/104; 426/283; 426/303
[58] Field of Search ............... 426/93, 103, 282, 283,
426/289, 303, 306, 660, 94, 104

[56] References Cited

U.S. PATENT DOCUMENTS

| 2,082,312 | 6/1937 | Todd | 426/93 |
|---|---|---|---|
| 3,814,819 | 6/1974 | Morgan | 426/103 |
| 4,205,091 | 5/1980 | Van Horne | 426/283 |
| 4,391,832 | 7/1983 | Haas, Sr. et al. | 426/103 |
| 4,430,351 | 2/1984 | Cillario | 426/282 |
| 4,545,997 | 10/1985 | Wong et al. | 426/283 |
| 4,563,363 | 1/1986 | Yoon | 426/303 |
| 4,569,848 | 2/1986 | Giorgetti et al. | 426/103 |
| 4,661,360 | 4/1987 | Smith | 426/283 |

FOREIGN PATENT DOCUMENTS 86319  8/1983  European Pat. Off. .

Primary Examiner—Donald E. Czaja
Assistant Examiner—Drew S. Workman
Attorney, Agent, or Firm—Bernard, Rothwell & Brown

[57] ABSTRACT

A chocolate bar is disclosed which comprises a chocolate base, at least one first wafer sheet placed on the chocolate base and having an interconnecting web and a plurality of hollow projections extending from the wafer sheet web on the side opposite the chocolate base. The chocolate bar further includes an anhydrous creamy filling housed in the cavities of the projections and a coating of chocolate deposited on the outer surface of the wafer sheet.

11 Claims, 1 Drawing Sheet

CHOCOLATE AND WAFER BAR

BACKGROUND OF THE INVENTION

1. Field of the Invention

The present invention relates to a chocolate bar of the type comprising a base or matrix of chocolate including at least one second food product which contributes to or complements the organoleptic properties of the chocolate.

Chocolate bars including nuts dispersed in the chocolate matrix are known. From the point of view of their appearance, these nut chocolate bars are characterized by the fact that the nuts project partially from at least one surface of the bar and the projecting parts are usually covered by a thin layer of the chocolate constituting the matrix.

If any portion of the projecting surfaces of the nuts is exposed directly to the air as a result of any production defects, there is the problem that the nuts become rancid. There is thus a high risk that the product will age rapidly.

SUMMARY OF THE INVENTION

The object of the present invention is to produce a chocolate bar of the type mentioned above which has similar aesthetic and organoleptic characteristics to those of nut chocolate bars and is free from the above problem.

This object is achieved by means of a chocolate bar, characterized in that it comprises:
a chocolate base,
at least one sheet of wafer placed on the chocolate base and having an interconnecting web and a plurality of hollow projections extending from the wafer sheet web on the side opposite the base,
an anhydrous creamy filling housed in the cavities of the projections, and
a coating of chocolate deposited on the outer surface of the wafer sheet.

BRIEF DESCRIPTION OF THE DRAWINGS

Further characteristics and advantages of the chocolate bar according to the invention will become clear from the detailed description which follows with reference to the appended drawings, provided by way of non-limiting example, in which.

DETAILED DESCRIPTION OF THE INVENTION

Figure 1:
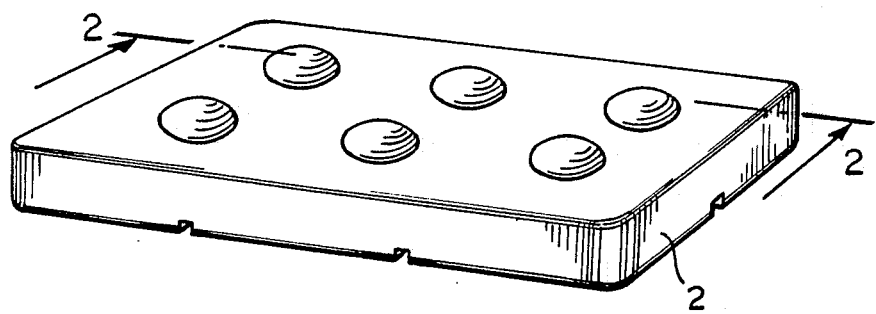
FIG. 1 is a perspective view of a chocolate bar.
Figure 2:
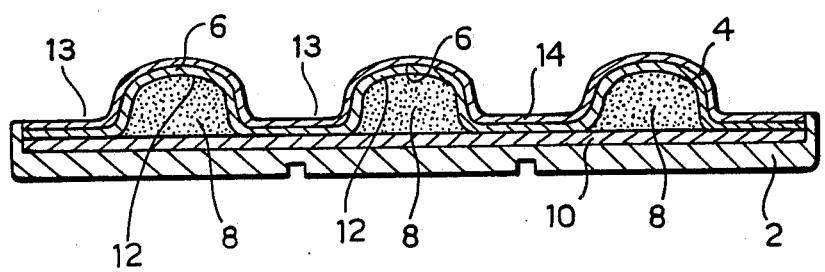
FIG. 2 is a section taken on the line II—II of FIG. 1.

With reference to the drawings, a chocolate bar is constituted by a chocolate base 2 which preferably has raised edges like a tray and the outer surface of which has a series of transverse grooves defining squares between them.

The chocolate of the base may be selected from plain chocolate, milk chocolate, chocolate cream or special chocolate with coconut or almonds.

A layer of wafer sheet 4 which has an interconnecting web 13 is placed on the base 2 and has a plurality of projections 6 with concavities facing towards the base 2. The wafer sheet may be made from various raw materials, such as wheat, barley or rice flour and the like, with the possible addition of elements which are pleasing from the organoleptic and nutritional points of view, such as certain oils, normal or special sugars, cocoa, emulsifiers, flavourings and salts.

A substantially anhydrous edible cream 8 is placed in the concavity defined by each projection of the wafer sheet. In the preferred embodiment, a nut cream is used so that the chocolate bar not only has an appearance similar to that of a nut chocolate bar, but also has a comparable flavour. By way of example, a nut cream usable as a filling has the following composition:

| | |
|---|---|
| sugar | 40–50% |
| nut paste | 10–15% by weight |
| cocoa | approx. 5% by weight |
| milk powder | 2–10% by weight |
| vegetable oil | 30–40% by weight |
| soya lecithin and flavourings | q.s. |

However, it is intended that other creams, for example, cocoa, almond, coffee, coconut, or forest-fruit creams, also substantially anhydrous and having a humidity content low enough not to cause damage to the wafer sheet, could be used.

A second, preferably flat wafer sheet 10 may possibly be interposed between the sheet 4 with the projections and the base 2, so as to define a plurality of cells 12 containing the anhydrous cream filling.

A further enrobing layer 14 of chocolate coats the outer surface of the wafer sheet, thus acting as cement for fixing the sheet to the base 2.

The method for producing the bar comprises the preparation of the base 2 by moulding and the preparation of the wafer sheet by baking in an oven by known techniques; the anhydrous cream is then deposited in the cells defined by the projections and subsequently cooled so as to bring it to the consistency of a pasty layer. The wafer sheet containing the anhydrous cream in its cells is turned over and positioned on the chocolate base 2 and is then enrobed by poured chocolate to form the coating layer 14.

Alternatively, the bar may be produced by depositing a first layer of chocolate intended to form the coating 14 on a mould which has cavities complementary to the projections of the wafer sheet and is arranged with its concavities facing upwards, and then by positioning the wafer 4 on the chocolate coating with its projections housed in the complementary cavities of the mould. The appropriate cream is then introduced into the cavity of each projection and covered with poured chocolate to form the base layer 2.

By virtue of the use of a wafer sheet which stays crunchy since it is in contact with a substantially anhydrous cream, the bar including the nut-cream filling not only appears and tastes similar to a bar of nut chocolate, but also has a resistance to chewing similar to that of a bar of nut chocolate. The bar thus produced may naturally be kept for long periods of time without substantial variation in its properties.

I claim:
1. A chocolate bar comprising:
   a. a chocolate base;
   b. at least one first wafer sheet placed on said chocolate base and having an interconnecting web and a plurality of hollow projections extending from the wafer sheet web on the side opposite said chocolate base, said projections defining cavities;
   c. an anhydrous creamy filling housed in the cavities of said projections; and d. a coating of chocolate deposited on the outer surface of the wafer sheet.

2. A bar according to claim 1, further comprising a second wafer sheet which is interposed between the first wafer sheet and said chocolate base and wherein said first wafer sheet and said second wafer sheet define substantially closed cells containing the creamy filling.

3. A bar according to claim 1, wherein the filling is comprised of an anhydrous cream with a nut-paste base.

4. A process for preparing a chocolate bar, comprising:
   a. a step of providing a first wafer sheet having an interconnecting web and a plurality of hollow projections extending from the wafer sheet web and defining cavities;
   b. providing within said cavities a creamy anhydrous filling;
   c. coupling a chocolate base to the wafer sheet on the side facing said cavities; and
   d. providing on the side of said wafer sheet opposite to the chocolate base a chocolate coating layer.

5. A process according to claim 4, comprising cooling the creamy filling housed within said cavities so as to bring it to a pasty consistency and superimposing the wafer sheet onto the chocolate base.

6. A process according to claim 4, wherein a second wafer sheet is interposed between the first sheet and the chocolate base so as to define a plurality of cells containing said filling.

7. A process according to claim 4, comprising depositing a first layer of chocolate intended to form said coating layer on a mould having cavities complementary to the projections of the wafer sheet, positioning the wafer sheet on the coating layer with its projections housed in the complementary cavities of the mould, providing the creamy filling into the cavity of each projection and covering with poured chocolate to form the chocolate base.

8. A bar according to claim 1, wherein said creamy filling is housed only in the cavities of said projections.

9. A bar according to claim 2, wherein said second wafer sheet is substantially flat.

10. A bar according to claim 1, wherein said interconnecting web is positioned substantially adjacent said chocolate base.

11. A bar according to claim 2, wherein said interconnecting web is positioned substantially adjacent said second wafer sheet.

* * * * *